United States Patent
Tchatchoua et al.

(10) Patent No.: US 11,248,684 B2
(45) Date of Patent: Feb. 15, 2022

(54) ACTUATOR WITH AN ANTI-BACKBEND CHAIN

(71) Applicant: IWIS ANTRIEBSSYSTEME GMBH & CO. KG, Munich (DE)

(72) Inventors: Joel Tchaweu Tchatchoua, Puchhelm (DE); Orhan Sahin, Munich (DE); Thomas Wolf, Munich (DE); Frank Rasch, Wilnsdorf (DE); Abhijit Potdar, Munich (DE); Toralf Teuber, Neufahrn (DE); Gerhard Hartinger, Geretsried (DE)

(73) Assignee: IWIS Antriebssysteme GmbH & Co. KG, Munich (DE)

( * ) Notice: Subject to any disclaimer, the term of this patent is extended or adjusted under 35 U.S.C. 154(b) by 802 days.

(21) Appl. No.: 16/071,355

(22) PCT Filed: Jan. 20, 2017

(86) PCT No.: PCT/EP2017/051198
§ 371 (c)(1),
(2) Date: Jul. 19, 2018

(87) PCT Pub. No.: WO2017/125555
PCT Pub. Date: Jul. 27, 2017

(65) Prior Publication Data
US 2021/0207692 A1 Jul. 8, 2021

(30) Foreign Application Priority Data
Jan. 20, 2016 (DE) .......................... 102016000568.8

(51) Int. Cl.
*F16H 19/00* (2006.01)
*F16H 19/06* (2006.01)
(Continued)

(52) U.S. Cl.
CPC ......... *F16H 19/0636* (2013.01); *F16G 13/20* (2013.01); *F16H 19/0645* (2013.01);
(Continued)

(58) Field of Classification Search
CPC .. F16H 19/0636; F16H 19/0645; F16G 13/20; E05F 15/603; E05Y 2201/656; E05Y 2900/132; E05Y 2900/148
See application file for complete search history.

(56) References Cited

U.S. PATENT DOCUMENTS

| 2011/0126650 A1* | 6/2011 | Sorensen | F16G 13/20 74/89 |
| 2011/0154923 A1* | 6/2011 | Fejer | E05F 15/619 74/89.21 |

(Continued)

FOREIGN PATENT DOCUMENTS

| DE | 714768 | 12/1941 |
| DE | 20221581 U1 | 6/2006 |

(Continued)

OTHER PUBLICATIONS

International Search Report issued by the European Patent Office in International Application PCT/EP2017/051198.

(Continued)

*Primary Examiner* — David M Fenstermacher
(74) *Attorney, Agent, or Firm* — Henry M. Feiereisen LLC

(57) ABSTRACT

The invention relates to an actuator with an anti-backbend chain, a drive motor, and a worm which can be driven by the drive motor and which comprises a helical groove. The anti-backbend chain has engagement means and is guided along the worm, and the chain is in engagement with the worm by means of the engagement means and the helical groove to drive the anti-backbend chain. Such an actuator (Continued)

should have a more compact design and should optionally exhibit less wear. For this purpose, the core diameter of the worm is larger than twice the distance from the motor axis to the motor exterior along which the anti-backbend chain is guided, and the anti-backbend chain is guided at least partly along the drive motor by means of the engagement means.

18 Claims, 10 Drawing Sheets

(51) Int. Cl.
  *F16G 13/20* (2006.01)
  *E05F 15/603* (2015.01)
(52) U.S. Cl.
  CPC ....... *E05F 15/603* (2015.01); *E05Y 2201/656* (2013.01); *E05Y 2900/132* (2013.01); *E05Y 2900/148* (2013.01)

(56) References Cited

U.S. PATENT DOCUMENTS

| | | | | |
|---|---|---|---|---|
| 2013/0305854 | A1* | 11/2013 | Wildforster | E05F 3/102 74/89 |
| 2014/0196553 | A1* | 7/2014 | Rinman | F16H 19/0645 74/89.2 |
| 2017/0030441 | A1* | 2/2017 | Irwin | E05F 15/619 |
| 2017/0191301 | A1* | 7/2017 | Glanz | E05F 15/00 |
| 2019/0003233 | A1* | 1/2019 | Shao | F16H 57/039 |
| 2019/0217330 | A1* | 7/2019 | Zhu | F16G 13/20 |
| 2019/0322501 | A1* | 10/2019 | Seigneur | F16G 13/06 |
| 2019/0331204 | A1* | 10/2019 | Cai | F16H 19/0645 |
| 2019/0383357 | A1* | 12/2019 | Adams, Jr. | F16G 13/20 |
| 2020/0018378 | A1* | 1/2020 | Hebbecker | F16G 13/20 |
| 2020/0223637 | A1* | 7/2020 | Galassini | B65G 15/30 |
| 2020/0300014 | A1* | 9/2020 | Frede | E05F 15/60 |
| 2020/0339396 | A1* | 10/2020 | Bodechon | F16G 13/07 |
| 2020/0340549 | A1* | 10/2020 | Bodechon | F16G 13/20 |
| 2020/0355008 | A1* | 11/2020 | Kreisfeld | E05F 15/619 |
| 2021/0115713 | A1* | 4/2021 | Sellar | E05C 1/085 |
| 2021/0123278 | A1* | 4/2021 | Chambers | B64C 1/1438 |

FOREIGN PATENT DOCUMENTS

| | | |
|---|---|---|
| EP | 1859977 A2 | 11/2007 |
| EP | 2386781 A1 | 11/2011 |
| GB | 2059499 A | 4/1981 |
| JP | 2011137514 A | 7/2011 |
| JP | 2011144874 A | 7/2011 |
| WO | WO 03014507 A1 | 2/2003 |
| WO | WO 2014097211 A1 | 6/2014 |

OTHER PUBLICATIONS

Thomas Wolf et al, U.S. Pat. No. 9,829,326, Nov. 28, 2017, 2015/0120181, Apr. 30, 2015.

* cited by examiner

ACTUATOR WITH AN ANTI-BACKBEND CHAIN

CROSS-REFERENCES TO RELATED APPLICATIONS

This application is the U.S. National Stage of International Application No. PCT/EP2017/051198, filed Jan. 20, 2017, which designated the United States and has been published as International Publication No. WO 2017/125555 and which claims the priority of German Patent Application, Serial No. 10 2016 000 568.8, filed Jan. 20, 2016, pursuant to 35 U.S.C. 119(a)-(d).

BACKGROUND OF THE INVENTION

The present invention relates to an actuator having an anti-backbend chain, a drive motor, and a worm with a helical groove driven by the drive motor, wherein the anti-backbend chain has engagement means, is guided along the worm, and is in engagement with the same by means of the engagement means and the helical groove to drive the anti-backbend chain.

An actuator which moves an anti-backbend chain by means of a spindle driven by a motor is known from DE 20221581 U1. The actuator is used, for example, to open and close a window sash. The electric motor is equipped with a transmission and drives the spindle substantially as an extension of the motor. The chain is also mainly accommodated as an extension of the electric motor along the spindle with which the chain engages. This actuator provides its lifting movement substantially perpendicular to the spindle axis. For this purpose, the anti-backbend chain is deflected in front of the electric motor and guided to the outside, where it is then connected to the element to be actuated—such as a window sash. This leads to a very slim design of the actuator; however, it occupies a considerable length.

A hand-operated version of an anti-backbend chain actuator is known from DE714768. In this case as well, there is a deflection of the chain in such a manner that an unfavorable accommodation of the chain results.

In the known actuators which have an anti-backbend chain, the accommodation of the chain leads to a space-occupying design, and, depending on the direction of the pushing force, to not-insignificant wear.

SUMMARY OF THE INVENTION

It is therefore an object of the present invention to provide an actuator of the type mentioned above which offers expanded possibilities for accommodating the chain, and has little wear.

As such, in a generic actuator, the core diameter of the worm is greater than twice the distance of the motor axis to the motor exterior along which the anti-backbend chain is guided, and the anti-backbend chain is guided at least partially laterally along the drive motor by means of the engagement means. This means that the area occupied by the drive motor of the actuator is also rendered at least partially usable by the chain length at the same time, such that the actuator makes do with a smaller overall length in relation to a certain chain length. Due to this gain in constructed space, for some applications it is unnecessary to guide the chain out perpendicular to the worm axis, and to perform the actuation. Rather, the actuation can be performed along the worm—preferably parallel to the worm axis. Due to the fact that the chain does not have to be deflected in such an embodiment in a region which transmits the pushing force, it is possible to keep wear low. With a corresponding design of the anti-backbend chain, such an arrangement also offers the possibility of transmitting the force either away from the drive motor or along the drive motor. In designs in which no deflection of the anti-backbend chain is required at all, pushing forces can be transmitted in both directions. In general, the invention results in a possible embodiment which can substitute for a hydraulic- or pneumatic cylinder by electrical means, wherein the actuation direction substantially coincides with that of hydraulic- and pneumatic cylinders. For reasons of simplification, the motor axis and the worm axis may preferably be arranged coaxially with each other. The worm then has a large diameter, which allows a corresponding partial guidance of the anti-backbend chain along the most functionally important components of the drive motor. If commercial drive motors are used, the chain is generally guided laterally past the drive motor (including the housing). Special constructions can also certainly allow integrated guidance of the anti-backbend chain along and/or through the drive motor. Regardless, the diameter of the worm in the case of a coaxial design will always be greater than the diameter of the motor rotor, and correspondingly larger than the associated dimension of the stator (without the motor housing). Any protruding parts of the anti-backbend chain are guided along the exterior of the motor. The term 'core diameter of the worm' is used in this context to mean the base diameter or foot diameter of the helical groove worked into the worm, for example. There are several ways that the anti-backbend chain can engage with the worm. The joint axes of the anti-backbend chain can be aligned exactly perpendicular to the worm axis, or run at a distance and transverse to the same.

In a particularly preferred embodiment, the anti-backbend chain is guided along the drive motor in a plane which is parallel to the geometric motor axis. Due to the fact that the anti-backbend chain is no longer deflected out of the plane in this region, it is also possible to apply a pushing force along this plane. However, regardless of whether a pushing force will be applied along the drive motor, the guidance in a plane is also suitable for achieving a compact design, since the anti-backbend chain can move along the drive motor close to the same.

In order to achieve a considerable reduction in length of such an actuator with an anti-backbend chain, according to a further variant the anti-backbend chain can be guided past the drive motor along a length which corresponds to at least 50% of the length, and preferably at least 80% of the length, of the drive motor. A reduction in length is particularly achieved if the pressing force is applied away from the drive motor, because then the non-pressurized or not force-loaded length of the drive chain extends along the drive motor and does not lead to a total extension of the actuator. For this reason, in a further embodiment, a chain depot can be constructed laterally along the drive motor, with at least two adjacent, preferably parallel sections of the anti-backbend chain. The depot can either be the total depot for the anti-backbend chain or an intermediate depot. Preferably, however, the end of the anti-backbend chain which is remote from the actuation is fixed in the depot area. Depending on the size of the drive motor, considerable chain length storage capacities result. In comparison with known actuators of this type, this variant is somewhat wider (in the worst case, slightly more than a chain width); however, the overall length of the actuator is shortened considerably when the anti-backbend chain is retracted.

Therefore, a section of the drive chain can be also conveniently accommodated in the chain depot, the length of which corresponds to at least 1.5 times the length of the drive motor. The chain is accordingly guided back and forth in the depot—which can also be done more than once.

According to a further embodiment, to avoid the need for any special constructions, and to make use of conventional drive motors, the worm axis and the motor axis are arranged coaxially, wherein the worm has an outside diameter which is greater than twice the distance between the motor axis and the exterior of the motor along which the anti-backbend chain is guided.

Many commercially available drive motors have a rotation speed which is too high, and have too little torque. Therefore, it is advantageous if the drive motor has a transmission which is coupled to the worm. Preferably, the transmission leads to a reduction and an increase in torque. Common translations are 4:1 or 6:1, by way of example.

The worm transmits the force to the anti-backbend chain. So that the anti-backbend chain is exposed to the least possible wear, a suitable selection of the worm material can lead to a corresponding advantage. Conveniently, therefore, the worm may have a sleeve-shaped worm body and a drive shaft connected to the same in a torque-proof manner. The worm body is then made of a material which wears more quickly—such as plastic, by way of example. Also, the frictional properties of the worm body can play an important role. The worm body can also be easily replaced by a non-worn worm body, which is then connected to the drive shaft in a torque-proof manner.

So that common anti-backbend chains can be used, the anti-backbend chain can advantageously have chain pins at least at predetermined intervals, which project on at least one side, in such a manner that a projecting part of the chain pin engages with the worm, or can be brought into engagement with the same. As a result, it is possible to use an anti-backbend chain with a known construction, in which only—and at least—some of the chain pins have an extended form. The form of all other components of the anti-backbend chain can be preserved, thereby requiring no revision.

In addition, the engagement means can have elements for reducing friction, in the form of at least one rotatable roller or a sliding shoe which engages in the helical groove of the worm. Sliding shoes may have the shape of a fitted key, or the cross-sectional shape of an ellipse, by way of example. Also, a height-convex fitted key shape or elliptical shape can be used. All lateral surfaces can be convex. The rollers can be mounted on ball bearings, or can actually be ball bearings themselves. The use of sintered rollers, which may be soaked in a lubricant, is also possible.

In a further embodiment, the engagement means have elements for slip compensation, in the form of a plurality of rotatable rollers arranged next to each other on a projecting chain pin, and/or a conical roller and a helical groove adapted thereto. Due to speed differences over the worm radius, slippage occurs at the contact points between roller and worm. If several shorter rollers are attached to one extended bolt, each roller will have a different speed. The slip is significantly reduced. Speed differences are compensated by means of the conicity of the rollers and the worm.

In a further embodiment, the anti-backbend chain is guided in the region of the worm and the drive motor by means of a guide rail, which supports a side facing away from the engagement side, as well as each of the outwardly facing sides of the anti-backbend chain. Materials which are advantageous in terms of their friction properties can be used for the rail. Also, the guide rail can be made interchangeable. The guide rail also offers the opportunity to furnish a targeted guidance of the anti-backbend chain—for example in a chain depot. The guide rail may also have rollers or wheels to reduce friction, or can be replaced by rollers or wheels.

If the actuator will be used as a separate unit for multiple applications, and as a substitute for, by way of example, a hydraulic- or pneumatic cylinder, it is of further advantage if it is a compact unit designed as a self-supporting construction which can be used as a module independently of the various application conditions. For this purpose, according to one variant, a support structure has a base plate and a bearing plate which is arranged on the base plate and bridges the anti-backbend chain, wherein the guide is arranged on the base plate and the worm is mounted on one side of the bearing plate. The base plate can then serve the purpose of attaching the actuator in the various installation situations.

Furthermore, the support structure may have a front plate which bridges the anti-backbend chain on the front end of the base plate, and an end plate at the rear end of the base plate substantially parallel to the bearing plate—as well as spacers. The front plate, the bearing plate, and the end plate are connected by means of—in addition to the base plate—the spacers which are routed past the worm and the drive motor. The front plate may form an outlet, together with the guide, for the actuating part of the anti-backbend chain, while all other components of the actuator are arranged inside the support structure and are protected by the same. This opens up the possibility of routing forces which may occur, due to the mounting situation of the actuator, past the drive motor and the worm. The front plate in this context can be used as a second bearing plate for the worm.

In this context, according to one variant, it is particularly advantageous if the drive motor is flanged on one side to the bearing plate. This ensures that forces resulting from the attachment of the actuator arise only in the bearing plate, and are otherwise kept away from the drive motor. In addition, this embodiment also provides the possibility of furnishing corresponding cooling devices at a distance from the supporting structure.

In particular, according to one embodiment, a compact design of the actuator is achieved if a cover is provided which covers the open longitudinal sides of the supporting structure, wherein the worm and the drive motor, and optionally the chain depot and/or the section of the anti-backbend chain guided along the side of the worm and the drive motor, are arranged between the base plate and the cover. In a variant in which the pushing force actuation occurs away from the drive motor, it is therefore possible to achieve a compact closed actuator, wherein only the actuating region of the anti-backbend chain travels out of and back into the housing thereof. Of course, electrical connections, and possibly attachment means, are provided on such a housing. Such a module provides an electronic alternative to hydraulic- and pneumatic cylinders. In order to prevent the entry of dirt, the guidance of the chain out of the housing can be equipped with a specially shaped brush. This brush could also relubricate the chain, including the friction reducing elements—especially the sliding shoes.

Furthermore, position elements can be attached to the anti-backbend chain, which can be detected by means of one or more sensors. Preferably, the position elements can be easily mounted and removed—for example, by clipping into the anti-backbend chain. Due to the fact that the anti-backbend chain does not require a sprocket for the drive thereof, the position element can be inserted in a gap of the chain (e.g., between two sleeves or rollers). Conveniently, the position element may be a permanent magnet with a holder, and the sensor may be a magnetic sensor, in particular a Hall sensor. Due to the easy displaceability of the position element, the stroke or the stroke limitation can be easily adjusted and/or set. The sensor then ensures a corresponding control of the drive motor. The drive motor is switched off, for example. An electronic control unit can also be installed in the housing, such that the actuator is fully functional and only needs to be supplied with power and is activated by control commands. The base plate can also serve to dissipate heat—for example, from the power semiconductors.

Clip-in magnetic markings (position elements) can be used as reference points, by means of which the electronic control unit may divide the total travel path into any number of partial paths.

In a further embodiment, two parallel worms are included, wherein the chain extends between the two worms and has engagement means for engagement with both worms. This allows a symmetrical introduction of force into the anti-backbend chain. Preferably, protruding bolts are used on both sides of the anti-backbend chain, each engaging in the associated worm. The worms may each have their own drive motor, wherein the anti-backbend chain is arranged between the drive motors. Alternatively, a transmission can be used which drives the second worm as well. The two worms should rotate in opposite directions, and the gearbox must be designed accordingly. In principle, the use of two worms is also suitable for a completely different arrangement of the drive motor—in particular if the same is positioned centrally between the two worms. In such a variant, not according to the invention, however, the chain must be deflected in order to be guided past the motor. However, in general, separate protection may be sought for the use of two worms which can engage with the anti-backbend chain from opposite sides—even independently of the invention defined in claim 1.

BRIEF DESCRIPTION OF THE DRAWING

In the following, an embodiment of the present invention will be explained in more detail with reference to drawings, wherein.

DETAILED DESCRIPTION OF PREFERRED EMBODIMENTS

Figure 1:
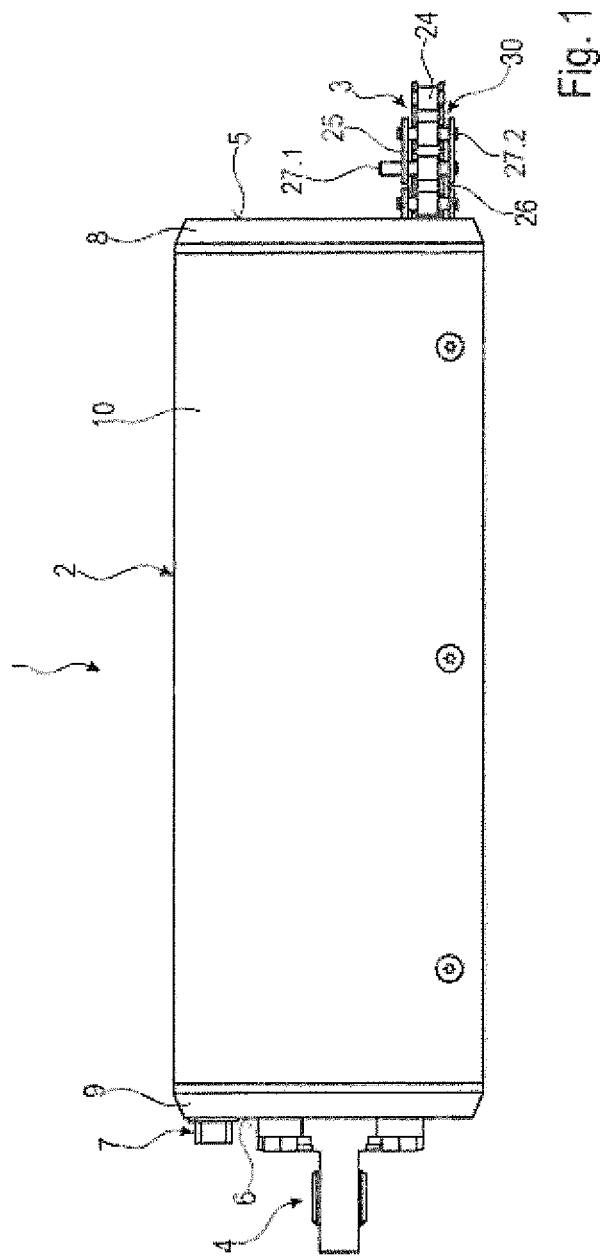
FIG. 1: shows a side view of an actuator according to the invention.

The actuator 1 shown in FIG. 1 comprises a box-shaped housing 2, a pushable anti-backbend chain 3, and a joint head 4 with ball joint for pivotal attachment. Instead of the joint head 4 with ball joint, numerous other mounting options for the actuator 1 can be provided. A direct attachment to the housing 2 can also be contemplated. The anti-backbend chain 3 moves in and out of the front end and/or front side 5 of the housing 2. The joint head 4 with ball joint is bolted to the rear end and/or the back side 6 of the housing 2. An electrical connection socket 7 for the supply of power is also situated on the back side 6. The housing 2 comprises, inter glia, a front plate 8, an end plate 9 and a cover 10 with a U-shaped cross-section, which is bolted to a base plate 11.

The housing 2 comprises a support structure to which, in addition to the front plate 8 and the end plate 9 arranged parallel thereto, the base plate 11 also belongs. Furthermore, the supporting structure also includes a bearing plate 12 arranged on the base plate 11 and extending parallel to the front plate 8 and end plate 9, as well as cylindrical spacers 13.1 and 13.2 between the front plate 8 and the bearing plate 12, and cylindrical spacers 14.1 and 14.2 between the bearing plate 12 and the end plate 9. The spacers 13.1 and 13.2 and/or 14.1 and 14.2 are bolted on the end faces thereof to the corresponding plates 8, 9, and 12. The base plate 11 extends over the entire length between the front plate 8 and the end plate 9. The cover 10 therefore serves only to cover the components arranged within the support structure and described further below.

An electric drive motor 15 and a transmission 16 which is functionally assigned to the drive motor 15 are arranged in the housing 2 between the bearing plate 12 and the end plate 9. The drive motor 15, together with the transmission 16, is fixed by means of a flange 17 to the bearing plate 12—i.e., bolted to the same. The drive motor 15, together with the transmission 16, is therefore only attached on one side to the bearing plate 12. The drive motor 15 has electrical connectors 18. For reasons of simplicity, the electrical lines to the connection socket 7 are not shown, The transmission 16 in the present case has a reduction ratio of 4:1. Other reductions are possible—by way of example, 6:1.

A worm 19 is rotatably mounted between the front plate 8 and the bearing plate 12. This means that ball bearings are arranged both in the bearing plate 12 and in the front plate 8, to support the worm 19.

The worm 19 is constructed in two pieces and comprises a worm body 20 and a drive shaft 21, which extends through the sleeve-shaped worm body 20 and is connected thereto in a torque-proof manner. The worm body 20 is made of a softer material than the drive shaft 21. Plastic or softer metals, such as brass, etc., can be used. The worm 19 has a circumferential helical groove 22 with a predetermined pitch on its shell surface and/or its outer circumference. The helical groove 22 has a substantially rectangular cross-section. The drive shaft 21 is connected in a torque-proof manner to a transmission shaft 23.

Figure 5:
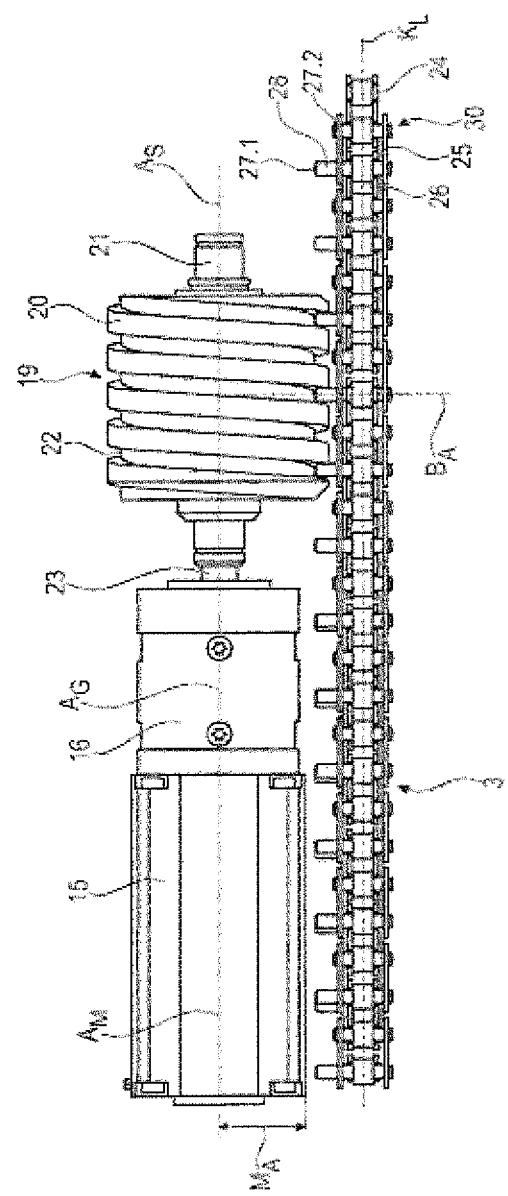
FIG. 5: shows a side view of essential functional components of the actuator.
Figure 6:
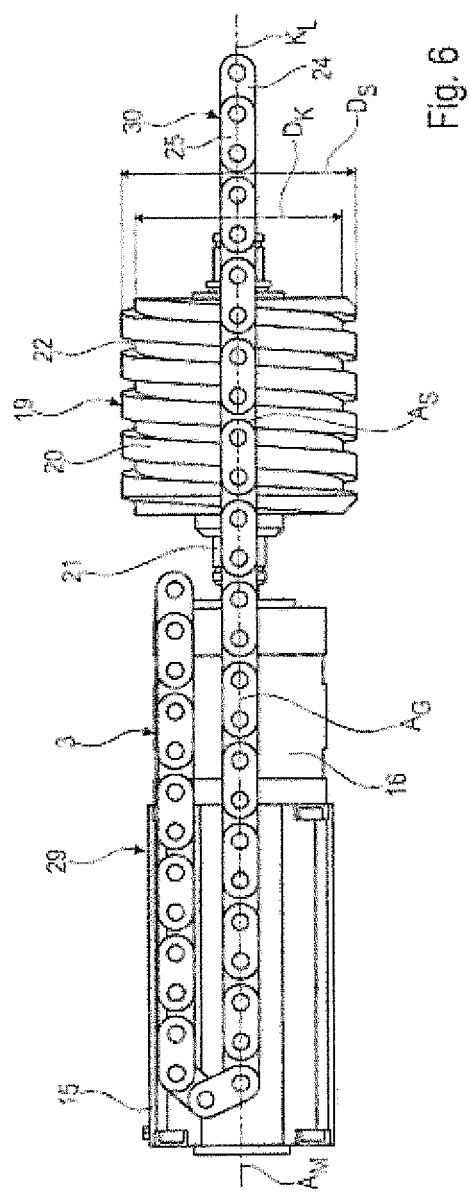
FIG. 6: shows a bottom view of the functional components of FIG. 5, FIG. 7: shows a sectional side view of a first variant of the worm and the anti-backbend chain.

In the present embodiment, the motor axis $A_M$, including the transmission axis $A_G$, is arranged coaxially to the worm axis $A_S$ (see FIG. 5). An offset arrangement is possible, but must meet the space requirements. The diameter $D_S$ of the worm 19 is relatively large, such that the outer circumference of the worm 19 projects beyond the outer circumference of the drive motor 15. This must be the case at least on the side facing the chain 3. The worm 19—that is, the worm body 20—has a core diameter $D_K$ which is also larger than the associated dimension of the drive motor 15 with the transmission 16.

The anti-backbend chain 3 is a roller chain consisting of inner chain links 24 and outer chain links 25. In addition, stiffening plates 26 are arranged between the inner chain links 24 and the outer chain links 25, which ensure that a pushing force can be transmitted in the substantially straight orientation of the anti-backbend chain 3. In one direction, however, the chain links 24, 25 are pivotable relative to each other. The chain pins 27.1 and 27.2 belong to the outer chain links 25. All ends of the chain pins 27.1 and 27.2 project at least slightly laterally; however, the chain pins 27.1 are made substantially longer than the chain pins 27.2, such that they protrude far enough on one side, to form an engagement region 28, that the engagement regions 28 can engage in the helical groove 22 of the worm 19, while the shorter chain pins 27.2 do not have such an engagement. In the present embodiment, every second link pin is designed with such an extension. The pitch of the helical groove 22 corresponds to the pitch of the anti-backbend chain 3. For a good engagement between the worm 19 and the anti-backbend chain 3, it is sufficient to extend only every second chain pin. The anti-backbend chain 3 is aligned in such a manner that it is guided on edge along the base plate 11. In the present case, therefore, the chain longitudinal axis $K_L$ is aligned parallel to the motor axis $A_M$, transmission axis $A_G$ and worm axis $A_S$. In the engagement region 28 of the anti-backbend chain 3 and the worm 19, the pin axes $B_A$ of the chain pins 27.1 substantially stand exactly upright on the worm axis $A_S$. The anti-backbend chain 3 is deflected once within the housing 2, such that below the drive motor 15 and the transmission 16, a chain depot 29 is located between the end plate 9 and the bearing plate 12. In the present embodiment, the chain depot 29 consists of two chain strands running parallel to each other, and the deflection region. Accordingly, a length of chain which is greater that 1.5-times the total length of the drive motor 15, including the transmission 16, is found in the chain depot 29. The deflection of the anti-backbend chain 3 naturally takes place about the axes of the chain pins, such that the entire anti-backbend chain 3 extends substantially in a plane (a plane perpendicular to the plane of the drawing in FIG. 5 on the chain longitudinal axis $K_L$, which is oriented parallel to the motor axis $A_M$, the transmission axis $A_G$, and the worm axis $A_S$). Of course, an anti-backbend chain 3 can have play in its joints, such that this is an idealized conception. As a result, this arrangement of the anti-backbend chain 3 causes the front region—that is, the actual actuating region of the anti-backbend chain 3—to be guided outwards centrally and on the lower end of the housing 2.

For this purpose, the front plate 8 has a window 31 through which the anti-backbend chain 3 can travel in and out.

Figure 2:
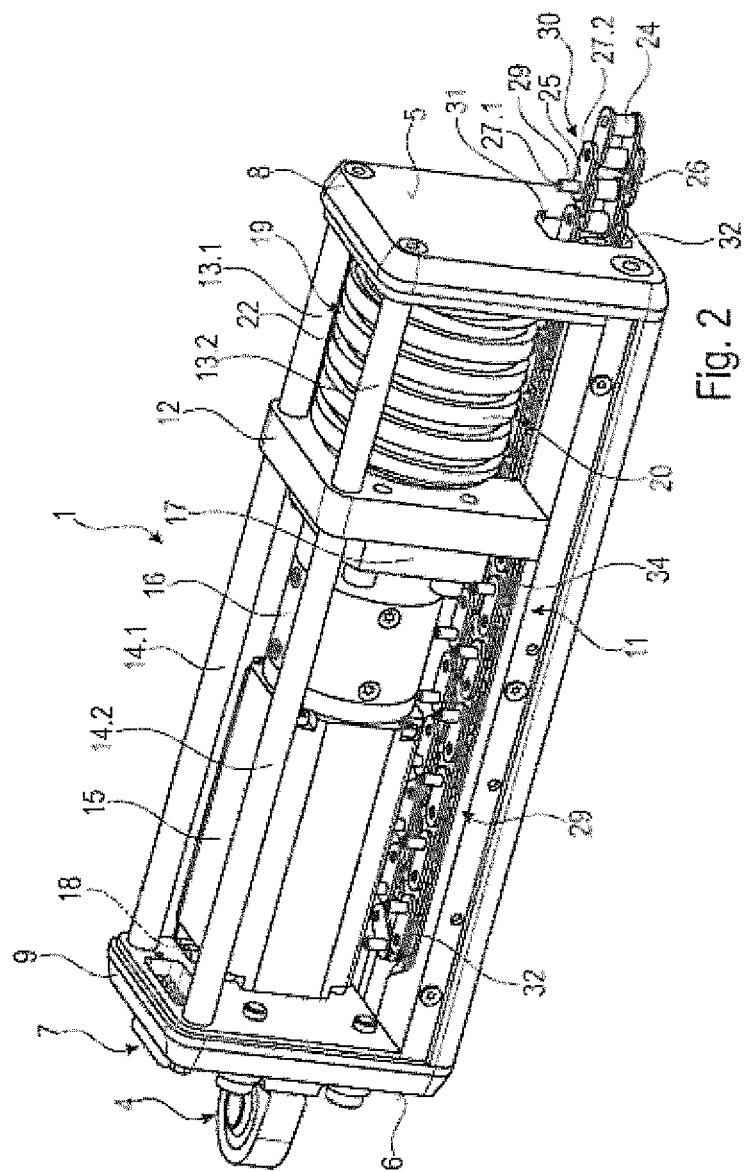
FIG. 2: shows a perspective side view of the actuator in FIG. 1, with a cover omitted.
Figure 3:
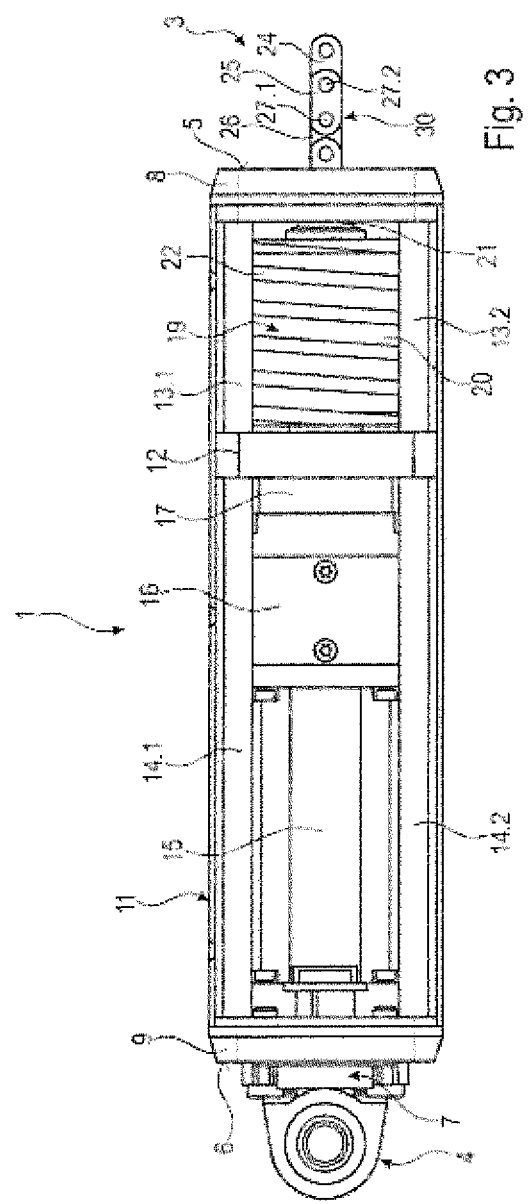
FIG. 3: shows a plan view of the actuator, without cover.

As can be seen in particular in FIG. 2, a groove structure is introduced in the base plate 11 so that the anti-backbend chain 3 can move in the same. In addition, the groove structure is designed in such a manner that the chain depot 29 is also formed therein. Guide rails 32 of a material with a low coefficient of friction are incorporated into the interior of the groove structure, both on the base thereof and on the side walls, and contact the front side and the back side of the anti-backbend chain 3. These guide rails 32 can be designed to be exchangeable.

Figure 4:
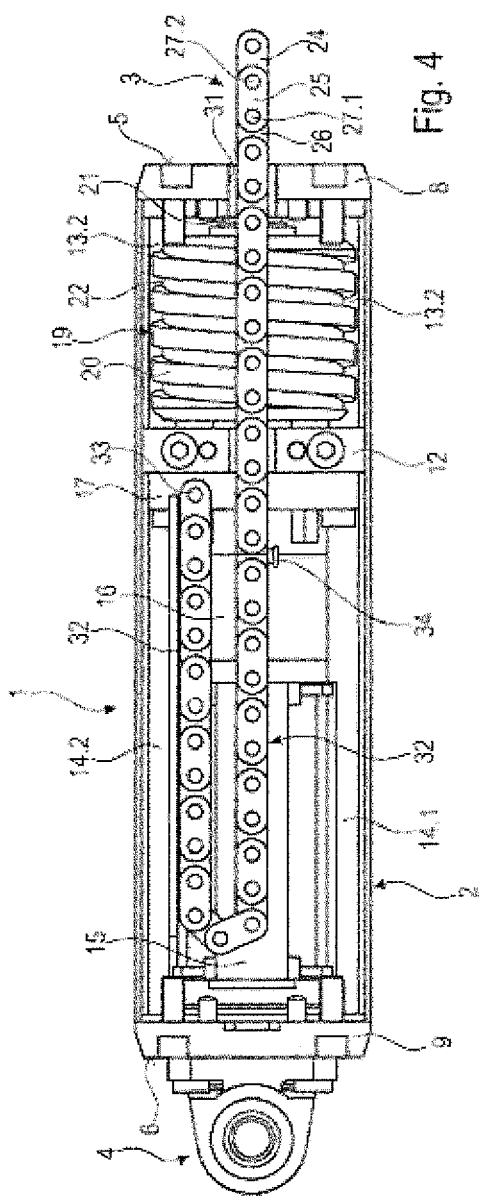
FIG. 4: shows a sectional bottom view of the actuator, wherein a base plate and guide rails have been omitted.

It can be seen from FIG. 4 that the last link of the anti-backbend chain 3, which is arranged inside the chain depot 29, is fastened to the base plate 11 by a stud bolt 33.

Figure 11:
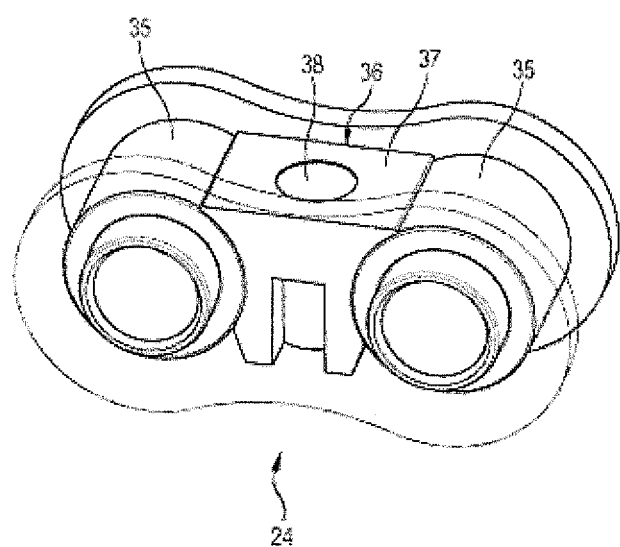
FIG. 11: shows an enlarged perspective view of an inner chain link with an inserted positioning element, wherein the front inner plate is shown as a transparent element.

Furthermore, a chain sensor 34 is included, which provides information about the position of the anti-backbend chain 3 and also shuts off the drive motor 15 when the end position is reached. The chain sensor 34 may also be wired to the socket 7 to transmit corresponding signals. In FIG. 11, an inner chain link 24 is shown. A position element 36 is inserted between the rollers 35 of the inner chain link. The position element 36 has a plastic holder 37 and a cylindrical permanent magnet 38. The plastic holder 37 is adapted to the space between the rollers 35 and clipped resiliently at this point. The position element 36 is located on an inner chain link 24 which prespecifies an end position or an intermediate position of the actuator 1. The chain sensor 34 detects the permanent magnet 38 and turns off the drive motor 15. The following describes the mode of action and functionality of the actuator 1 according to the invention described above.

The actuator 1 has a design and performance which make it a suitable replacement in certain application situations for hydraulic-, and in particular pneumatic, cylinders. The anti-backbend chain 3 offers the possibility of applying a pushing force. For this purpose, the foremost link of the actuating portion 30 is connected to the correspondingly actuated element, such as a window or a door, etc., by way of example. The figures show a substantially retracted position of the actuator 1. The rear end of the actuator 1 is attached by means of the joint head 4 with ball joint to an axle included for this purpose. The joint head 4 with ball joint allows pivoting in two axes, similar to the action of an arrangement of hydraulic- and pneumatic cylinders. Instead of expensive hydraulic- or pneumatic circuits, this electrically operated actuator 1 only needs to be connected to a power supply and, if necessary, to control electronics. The socket 7 serves this purpose. In use, the drive motor 15 drives the worm 19 with its motor shaft via the reduction provided by the transmission 16. The rotation of the worm 19 moves the anti-backbend chain 3. If the worm rotates clockwise, the anti-backbend chain 3 is moved out of the housing 2 by the engagement of the chain pins 27.1 in the helical groove 22. The element accordingly connected to the actuating portion 30 is actuated. The drive motor 15 is operated until the corresponding, desired chain length has been extended—but at the most, until the anti-backbend chain 3 has moved out of the chain depot 29 to its maximum extent. Due to the self-locking, a braking mechanism is not absolutely necessary. If the drive motor 15 is driven the other way—that is, if the worm 19 turns counterclockwise—the anti-backbend chain is retracted again. The corresponding arrangement in the chain depot 29 occurs entirely automatically, because the chain joints allow only pivoting in one particular direction.

Because the unloaded part of the anti-backbend chain 3 is particularly guided laterally past the drive motor 15, including the transmission 16 (i.e., in the region between the bearing plate 12 and the end plate 9), a considerable stroke can be realized without the actuator 1 needing to have an excessively long length. Only for the storage and passage of the chain 3 does it need to have a certain width and/or height. This opens up completely new and diverse applications for electrically operated actuators with anti-backbend chains 3. The modular design is suitable for a wide variety of applications, without the need to design special solutions. The interaction of the diameter $D_S$ of the worm 19, the engagement regions 28 (i.e., the height and/or width of the anti-backbend chain 3), and the outside dimension of the drive motor 15, including the transmission 16, lead to these advantages. In the concrete embodiment, this results in the anti-backbend chain 3 being able to extend overall in a single plane. In particular, the anti-backbend chain 3 does not have to be deflected in the loaded actuating region 30. A deflection takes place rather in the unloaded section in the region of the chain depot 29—that is, laterally along the drive motor 15, including the transmission 16.

Figure 7:
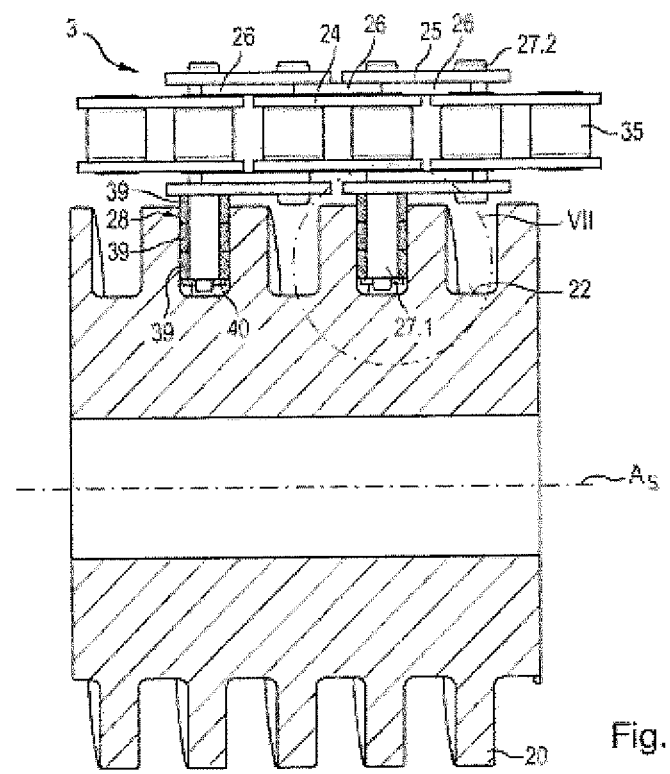
Figure 8:
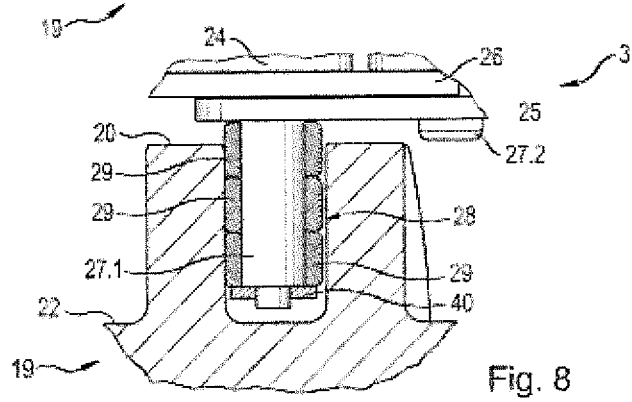
FIG. 8: shows an enlarged detail view of section VII of FIG. 7, FIG. 9: shows a sectional side view of a further variant of the worm and an engagement means of the anti-backbend chain.

The worm 19 shown in FIG. 7 has a slightly deeper helical groove 22 compared to the previous embodiment. The chain pins 27.1 engaged with the same are accordingly longer. On each of the projecting regions of the chain pins 27.1, three rotatably mounted rollers 39 are attached and secured by a lock washer 40. The rollers 39 are in contact with the driving flank of the helical groove 22 and act as friction reduction elements. Accordingly, low-friction materials, such as plastic or lubricant-impregnated porous materials (e.g., sintered rollers), can be used. Preferably, as in the present case, a subdivision into a plurality of rollers 39 is used, such that the same also serve as elements for slip compensation—because different speeds arise inside the helical groove 22 depending on the diameter. The wear is reduced accordingly in this way. The variant shown in FIG. 7 can be used as an alternative to the anti-backbend chain 3 and the worm 19 from the preceding embodiment.

Figure 9:
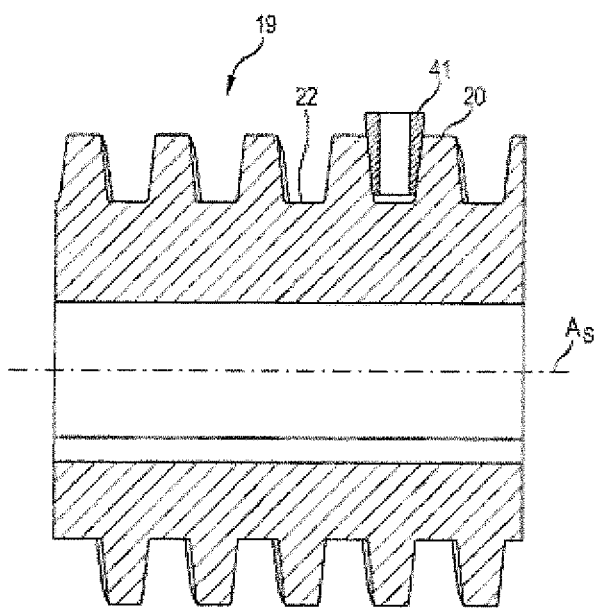

FIG. 9 shows an alternative to the embodiment just described. Instead of three rollers 39 arranged side by side, a single roller 41 is used in this embodiment; it is rotatably mounted on the projecting chain pin 27.1. The roller 41 is conical and engages in a corresponding, trapezoidal helical groove 22. The conical roller 41 in turn serves as an element for reducing friction, and, due to its conical shape and the shape of the helical groove 22 adapted thereto, it also serves as an element for slip compensation. By means of this conical roller 41, the speed differences over the height of the helical groove 22 can be very well compensated.

Figure 10:
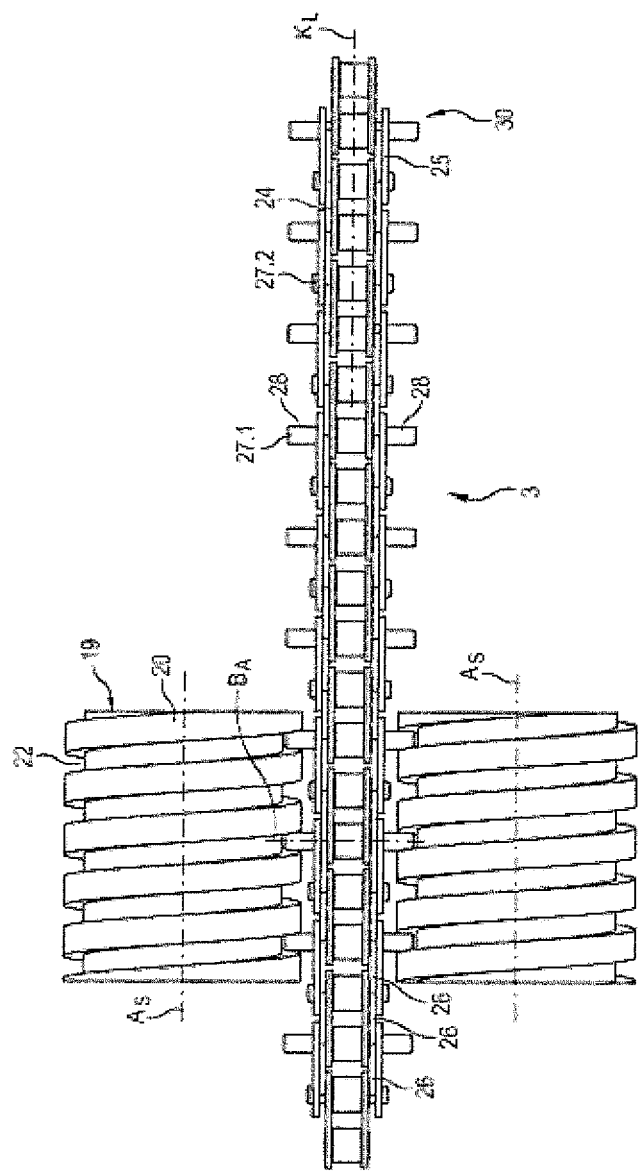
FIG. 10: shows a plan view of a variant with two worms and an anti-backbend chain which engages on both sides.

FIG. 10 illustrates an entirely different embodiment. Two worms 19 arranged rotatably in parallel next to each other are used. The anti-backbend chain 3 is guided between them. The chain pins 27.1 are designed protruding on both sides, and each engage at the same time in the helical grooves 22 of the two worms 19—which together and symmetrically drive the anti-backbend chain 3. In a preferred embodiment, each worm 19 is driven by its own drive motor, such that the anti-backbend chain 3 is guided between the two drive motors, and can be accommodated similarly to the first embodiment in a chain depot between the drive motors. Alternatively, only one of the two worms 19 can be driven by a drive motor arranged coaxially therewith, while the other worm is driven by means of a transmission. The use of two worms 22 can in principle also allow other arrangement options for one or more motors, which are also arrangement variants independent of the arrangement defined in claim 1, which is why the simultaneous use of two worms 19 for driving the anti-backbend chain 3 can also be seen as independent from the same.

What is claimed is:

1. An actuator, comprising:
a drive motor defining a motor axis;
a worm having a helical groove and driveable by the drive motor, said worm defined by a core diameter which is greater than twice a distance of the motor axis to a motor exterior; and
an anti-backbend chain guided along the worm and including engagement means configured for engagement in the helical groove for driving the antibackbend chain, said anti-backbend chain being guided along the motor exterior.

2. The actuator of claim 1, wherein the anti-backbend chain is guided along the drive motor in a plane which is arranged parallel to the motor axis.

3. The actuator of claim 1, wherein the anti-backbend chain is configured for guidance past a length of the drive motor, said length corresponding to at least 50% of a length of the drive motor.

4. The actuator of claim 1, wherein the anti-backbend chain is configured for guidance past a length of the drive motor, said length corresponding to at least 80% of a length of the drive motor.

5. The actuator of claim 1, further comprising a chain depot arranged laterally along the drive motor accommodating at least two adjacent sections of the anti-backbend chain.

6. The actuator of claim 5, wherein the at least two adjacent sections of the anti-backbend chain extend in parallel relation.

7. The actuator of claim 5, wherein the anti-backbend chain has a section defined by a length and accommodated in the chain depot, said length corresponding to at least 1.5 times a length of the drive motor.

8. The actuator of claim 1, wherein the drive motor includes a transmission which is coupled to the worm.

9. The actuator of claim 1, wherein the worm includes a sleeve-shaped worm body and a drive shaft which is connected to the worm body in a torqueproof manner.

10. The actuator of claim 1, wherein the engagement means of the antibackbend chain include chain pins which are disposed at predetermined intervals and projecting on at least one side such that a projecting part of the chain pins is able to engage with the worm.

11. The actuator of claim 1, wherein the engagement means includes a rotatable roller or a sliding shoe configured to reduce friction and to engage in the helical groove of the worm.

12. The actuator of claim 1, wherein the engagement means includes for slip compensation a plurality of rotatable rollers arranged next to each other on a projecting chain pin and/or a conical roller with the helical groove having a configuration adapted to the conical roller.

13. The actuator of claim 1, further comprising a guide rail guiding the antibackbend chain in a region of the worm and the drive motor and guiding and/or supporting a side facing away from an engagement side and respective outwardly facing sides of the anti-backbend chain.

14. The actuator of claim 1, further comprising a support structure including a base plate and a bearing plate which is arranged on the base plate and bridges the anti-backbend chain, said worm being mounted on one side of the bearing plate.

15. The actuator of claim 14, wherein the support structure includes a front plate which bridges the anti-backbend chain on a front end of the base plate, an end plate at a rear end of the base plate in substantially parallel relation to the bearing plate, and spacers routed past the worm and the drive motor and configured in addition to the base plate for connection of the front plate, the bearing plate, and the end plate.

16. The actuator of claim 14, further comprising a cover configured to cover open longitudinal sides of the support structure, wherein the worm and the drive motor are arranged between the base plate and the cover.

17. The actuator of claim 14, further comprising a chain depot arranged laterally along the drive motor and accommodating has at least two adjacent sections, and a cover configured to cover open longitudinal sides of the support structure, wherein the chain depot and/or a section of the anti-backbend chain guided along a side of the worm and the drive motor are arranged between the base plate and the cover.

18. The actuator of claim 1, further comprising two of said worm in parallel relation, said anti-backbend chain running between the two worms and including engagement means for engaging with both worms.

\* \* \* \* \*